US011148672B1

(12) United States Patent
Yamada et al.

(10) Patent No.: US 11,148,672 B1
(45) Date of Patent: Oct. 19, 2021

(54) METHOD FOR TIME SERIES STRUCTURE DISCOVERY

(71) Applicant: HRL Laboratories, LLC, Malibu, CA (US)

(72) Inventors: Kenji Yamada, Redondo Beach, CA (US); Rajan Bhattacharyya, Sherman Oaks, CA (US); Aruna Jammalamadaka, Agoura Hills, CA (US); Dmitriy V. Korchev, Irvine, CA (US); Chong Ding, Sunnyvale, CA (US)

(73) Assignee: HRL Laboratories, LLC, Malibu, CA (US)

( * ) Notice: Subject to any disclaimer, the term of this patent is extended or adjusted under 35 U.S.C. 154(b) by 737 days.

(21) Appl. No.: 15/939,010

(22) Filed: Mar. 28, 2018

Related U.S. Application Data

(60) Provisional application No. 62/484,505, filed on Apr. 12, 2017.

(51) Int. Cl.
*G06F 17/00* (2019.01)
*G06N 99/00* (2019.01)
*B60W 40/09* (2012.01)
*G06F 40/211* (2020.01)
*G06F 40/216* (2020.01)
*G06F 40/253* (2020.01)

(52) U.S. Cl.
CPC ........... *B60W 40/09* (2013.01); *G06F 40/211* (2020.01); *G06F 40/216* (2020.01); *G06F 40/253* (2020.01)

(58) Field of Classification Search
CPC ........ G06F 9/542; G06F 16/212; G06F 16/43; G06F 21/552; H04L 43/062; H04L 69/22; G06N 3/08; G06N 20/00; G06N 7/005; G06N 5/02; G06N 3/0472; G06N 3/049; G06N 3/088; G05B 13/04; G08B 21/0423; G06K 9/627; G06K 9/3233; G06K 9/4628; G06K 9/6264; G06K 9/66
See application file for complete search history.

(56) References Cited

U.S. PATENT DOCUMENTS

| 8,630,965 | B2* | 1/2014 | Savvides | ............ G06N 7/00 706/13 |
| 2018/0276278 | A1* | 9/2018 | Cagan | ............ G06N 5/022 |

FOREIGN PATENT DOCUMENTS

JP         2020179438 A  *  4/2019   ............ G06N 20/00

OTHER PUBLICATIONS

Betke M, Hariatoglu I, Davis L. (2000) Real time multiple vehicle detection and tracking from a moving vehicle. Machine Vision and Applications, 12: 69-83. (Year: 2000).*

(Continued)

*Primary Examiner* — Tuan C To
*Assistant Examiner* — Paul A Castro
(74) *Attorney, Agent, or Firm* — Tope-McKay & Associates

(57) ABSTRACT

Described is a system for analyzing time series data. A sequence of symbols is generated from a set of time series input data related to a moving vehicle using automatic segmentation. A grammar is extracted from the sequence of symbols, and the grammar is a subset of a probabilistic context-free grammar (PCFG). Using the grammar, time series input data can be analyzed, and a prediction of the vehicle's movement can be made. Vehicle operations for an autonomous vehicle are determined using the prediction.

18 Claims, 5 Drawing Sheets

304 — Using the grammar, analyzing the set of time series input data

306 — Generating a prediction of object movement

308 — Using the prediction for vehicle maneuver decisions

(56) References Cited

OTHER PUBLICATIONS

Kuehne, Arslan and Serre, "The Language of Actions: Recovering the Syntax and Semantics of Goal-Directed Human Activities," CVPR, 2014, pp. 780-787.
Geyik and Szymanski, "Event Recognition in Sensor Networks by Means of Grammatical Inference," INFOCOM, 2009, pp. 900-908.
Bender, et. al., "An Unsupervised Approach for Inferring Driver Behavior From Naturalistic Driving Data," IEEE Transactions on Intelligent Transportation Systems, TITS, vol. 16, No. 6, Dec. 2015, pp. 3325-3336.
Pollard, Carl; Ivan A. Sag, "Head-driven phrase structure grammar," Chicago: University of Chicago Press, 1994. The Introduction Section, pp. 1-14.
Chomsky, Noam, "Remarks on Nominalization," In: R. Jacobs and P. Rosenbaum (eds.), Reading in English Transformational Grammar, pp. 184-221, 1970.
C. D. Manning, H. Schutze, "Foundations of Statistical Natural Language Processing," MIT Press, Cambridge, MA, Chapter 11, p. 398, 1999.
Blei, Ng, and Jordan, "Latent Dirichlet Allocation," Journal of Machine Learning Research 3, 2003, pp. 993-1022.
C. D. Manning, H. Schutze, "Foundations of Statistical Natural Language Processing," MIT Press, Cambridge, MA, Chapter 3.2, p. 93, 1999.
Jurafsky and Martin, "Speech and Language Processing", Chapter 9.2, p. 326, Prentice Hall, 2000.

* cited by examiner

METHOD FOR TIME SERIES STRUCTURE DISCOVERY

CROSS-REFERENCE TO RELATED APPLICATIONS

This is a Non-Provisional patent application of U.S. Provisional Application No. 62/484,505, filed in the United States on Apr. 12, 2017, entitled, "A Method for Time Series Structure Discovery" the entirety of which are hereby incorporated by reference.

BACKGROUND OF INVENTION

(1) Field of Invention

The present invention relates to a system for time series analysis and, more particularly, to a system for time series analysis that analyzes the internal structure of the time series data.

(2) Description of Related Art

Time series analysis is a statistical technique that deals with time series data, or trend analysis. Time series data is data is in a series of particular time periods or intervals. There are many methods of time series analysis, and each method generates analysis from a different perspective. For instance, there have been attempts to utilize a grammar for time series analysis, such as described in Literature Reference Nos. 1 and 2 of the List of Incorporated Literature References. The work disclosed in Literature Reference No. 1 requires a hand-crafted grammar, instead of automatically extracting a grammar from the data. The work of Literature Reference No. 2 focuses on extracting a grammar.

One of the biggest problems in using a grammar in data analysis is the scalability of the algorithms. The most popular type of grammar is a context-free grammar, which is known to be a cubic-time algorithm. Therefore, only a short-length data can be analyzed by grammar-based algorithms. Literature Reference Nos. 1 and 2 use unconstrained context free grammar, instead of imposing a kind of grammar.

Thus, a continuing need exists for a system that analyzes the internal structure of time series and is limited to head grammar to improve efficiency.

SUMMARY OF INVENTION

The present invention relates to a system for time series analysis and, more particularly, to a system for time series analysis that analyzes the internal structure of the time series data. The system comprises one or more processors and a non-transitory computer-readable medium having executable instructions encoded thereon such that when executed, the one or more processors perform multiple operations. The system generates a sequence of symbols from a set of time series input data related to a moving vehicle using automatic segmentation. A grammar is extracted from the sequence of symbols, wherein the grammar is a subset of a probabilistic context-free grammar (PCFG).

In another aspect, raw time series data are converted into the set of time series input data, wherein multi-valued data is combined into a single value data.

In another aspect, the sequence of symbols comprises one of topic labels and cluster identifications.

In another aspect, the set of time series input data is expressed in terms of grammar rules, and each grammar rule has a left-hand side symbol and at least one right-hand side symbol, and the left-hand side symbol is always one of the right-hand side symbols.

In another aspect, a probability is associated with each grammar rule, wherein grammar rules having a probability below a predetermined threshold are discarded, and grammar rules having a probability above a predetermined threshold become the grammar.

In another aspect, automatic segmentation generates a fixed number of symbols.

In another aspect, the invention comprises a system for controlling an autonomous vehicle. The system uses a grammar extracted from a set of time series input data related to a moving vehicle for analyzing the set of time series input data. A prediction of the vehicle's movement is generated, and vehicle operations for the autonomous vehicle are determined using the prediction.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
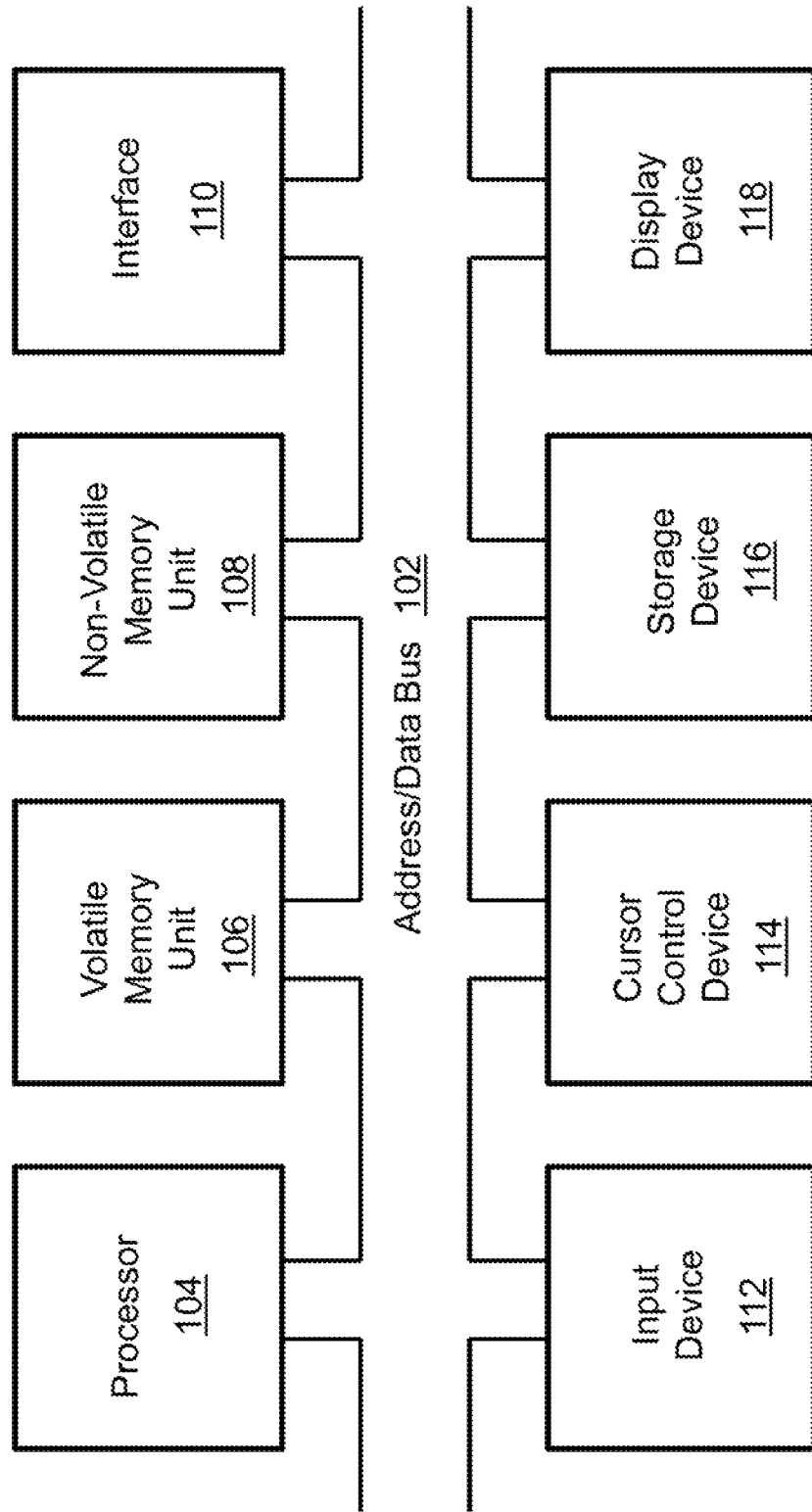
FIG. 1 is a block diagram depicting the components of a system for time series analysis according to some embodiments of the present disclosure.

The present invention relates to a system for time series analysis and, more particularly, to a system for time series analysis that analyzes the internal structure of the time series data. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Kuehne, Arslan and Serre, "The Language of Actions: Recovering the Syntax and Semantics of Goal-Directed Human Activities," CVPR, 2014.
2. Geyik and Szymanski, "Event Recognition in Sensor Networks by Means of Grammatical Inference," INFOCOM, 2009.
3. Bender, et. al., "An Unsupervised Approach for Inferring Driver Behavior From Naturalistic Driving Data," TITS, 2015.
4. Pollard, Carl; Ivan A. Sag, "Head-driven phrase structure grammar," Chicago: University of Chicago Press, 1994.
5. Chomsky, Noam, "Remarks on Nominalization," In: R. Jacobs and P. Rosenbaum (eds.), Reading in English Transformational Grammar, 184-221, 1970.
6. C. D. Manning, H. Schutze, "Foundations of Statistical Natural Language Processing," MIT Press, Cambridge, Mass., Chapter 11, p. 398, 1999.
7. Blei, Ng, and Jordan, "Latent Dirichlet Allocation," Journal of Machine Learning Research, 2003.
8. C. D. Manning, H. Schutze, "Foundations of Statistical Natural Language Processing," MIT Press, Cambridge, Mass., Chapter 3.2, p.93, 1999.
9. Jurafsky and Martin, "Speech and Language Processing", Chapter 9.2, p. 326, Prentice Hall, 2000.

(2) Principal Aspects

Various embodiments of the invention include three "principal" aspects. The first is a system for time series analysis. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
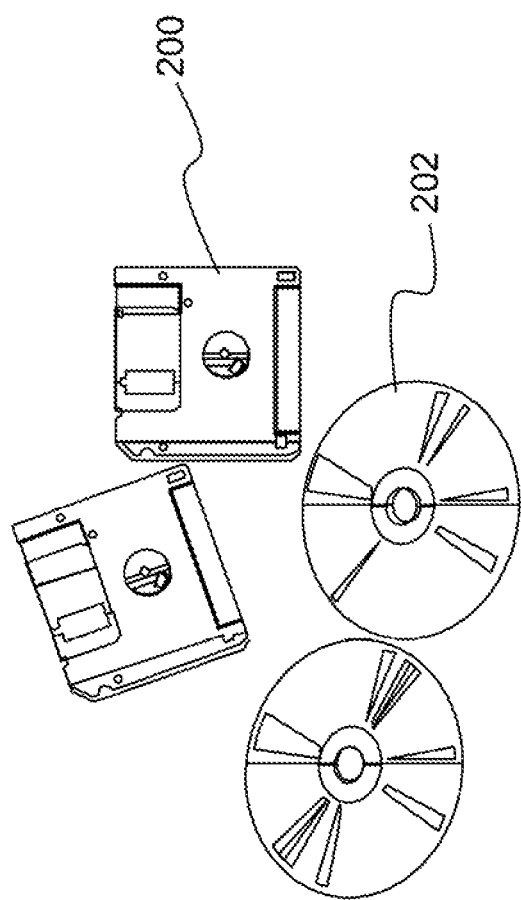
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Described is a system and method for analyzing time series data, by extracting its "grammar" automatically. The method according to embodiments of the present disclosure can be applied to wide varieties of data types, such as network packets or distributed sensory data. In an embodiment described herein, time series data of moving objects, such as vehicles, is used. However, as can be appreciated by one skilled in the art, the method can be applied to other types of data, such as network packets or distributed sensory data. The method described herein uses a general method of automatic segmentation that constructs grammar terminal symbols. Further, the method applies the idea of head-grammar in grammar construction. Each of these aspects will be described in further detail below.

The invention described herein analyzes the internal structure of the data, that is expressed in terms of "grammar rules" (see Literature Reference No. 9 for a description of grammar and production rules). Some existing methods analyze the data characteristics without considering the internal structure of the data, while the method described herein focuses on the data structure. A formal grammar is a set of production rules for strings in a formal language. The rules describe how to form strings from the language's alphabet that are valid according to the language's syntax. A formal grammar is a set of rules for rewriting strings, along with a "start symbol" from which rewriting starts. A context-free grammar is a grammar in which the left-hand side of each production rule consists of only a single nonterminal symbol.

(3.1) Processing Steps

The method according to embodiments of the present disclosure is primarily divided into a data segmentation component and a grammar extraction component. The first component, data segmentation, utilizes an automatic segmentation algorithm, such as clustering or topic models. In experimental studies of the invention, a topic modeling algorithm, called Latent Dirichlet Allocation (LDA) model (see Literature Reference No. 7), was used. However, any suitable algorithm, such as k-means clustering or spectral clustering, can be used.

The raw data must be converted into a format that is accepted by the segmentation algorithm. For example, if using the LDA model and if the raw data is a non-discrete or unbounded value (such as integer or real number), then one needs to quantize the data to feed to the segmentation algorithm. Additionally, the input is often multi-valued data (such as x-location and y-location), then it must be combined into a single value data. One method is to concatenate two quantized symbols into one symbol. For example, if the input data is (2.34, 5.78) in XY-coordinate, the converted symbol is X23Y58, by rounding to the first decimal point, and concatenation.

In addition, it is also possible to augment the input data of its history. For example, each input data is associated with the values of 1-second and 2-seconds before, thus it becomes a set of three symbols, such as [X13Y38, X18Y48, X23Y58]. There are many ways to convert the raw data, and the method selected affects the model accuracy. Therefore, it may require some domain knowledge to design how the raw data is converted. The converted raw data as above is the input for the segmentation algorithm, which now produces a sequence of labels, such as topic labels (if using topic models), or cluster IDs (if using a clustering algorithm).

The second component, grammar extraction, uses the sequence of labels as an input. This component sees the input data as a sequence of sentences, and builds up a grammar (a mathematical form of internal structure) that can generate those sentences. The work described in Literature Reference No. 2 (in Section 8-D) describes a grammar extractor, but their grammar is an unconstrained probabilistic context free grammars (PCFG), unlike the method described herein, which limits the grammar to be a "head-grammar". The "head-grammar" is a subset of PCFG, and it is a simplification of linguistic theory according to embodiments of the present disclosure. One way of defining head grammars is to replace the terminal strings of context free grammars (CFGs) with indexed terminal strings, where the index denotes the "head" word of the string. Further, the idea of "headness" in grammar theory is that one of the children in each of the grammar rules is designated as "head", and it is the main component among the children. Each grammar rule has a head, or left-hand side, which consists of the string that may be replaced, and a body, or right-hand side, which consists of a string that may replace it. Rules are often written in the form head→body (e.g., the rule a b specifies that a can be replaced by b).

Following a standard notation in describing an English grammar (see Literature Reference No. 8), one can write grammar rules as follows:

S→NP VP
NP→DET NOUN
NP→PRON NOUN
VP→VERB NP.

The rules above roughly say that a sentence (S) is composed of a noun phrase (NP) and a verb phrase (VP). A noun phrase can be composed of either a determiner (DET) and a noun (NOUN), or a pronoun (PRON) and a noun. A verb phrase is composed of a verb (VERB) and a noun phrase.

In the idea of X-bar theory, which is a linguistic theory that formalizes the generalization of grammar rules, it can be written as follows:

V"→N'V'
N'DET N
N'PRON N
V'→V N'.

The rules above applied some linguistic generalization. For example, if a sentence (S) and a verb phrase (VP) are the projection (generalization) of a verb (V), then they are written as V" and V', respectively. Similarly, a noun phrase (NP) is a projection of noun (N), thus written as N'.

Following the idea of X-bar theory, a subset of PCFG, called "head-grammar" is defined, according to embodiments of the present disclosure, where the left-hand-side symbol of the rule is always one of the right-hand-side symbols. In addition, there is also a restriction that there are only two children. Therefore, the grammar rule described herein looks like either of the following two:

H→HC
H→CH.

These two rules are a kind of meta-rule, in which one needs to instantiate a specific rule by assigning a specific grammar symbol to H or C. This is shown in the following.

The preprocessing step (i.e., data segmentation) produces a fixed number of labels (e.g., topic label, cluster IDs). For example, if there are only three labels A, B, and C from the segmentation preprocessing, then the following grammar rules are prepared:

S→A
S→B
S→C
A→AB
A→BA
A→AC
A→CA
B→BA
B→AB
B→BC
B→CB
C→CA
C→AC
C→CB
C→BC An extra symbol S is added, following a standard practice, to define the top-level symbol.

For each grammar rule, a probability is associated. There is a well-known algorithm (inside-outside algorithm) that assigns probabilities so as to maximize the training data likelihood (see Literature Reference No. 6). The algorithm is utilized to obtain the probability of each rule above. The probability is added to each rule of CFG (Context Free Grammar), to make it as PCFG (Probabilistic Context Free Grammar). If the probability is too small (such as 1e-10), the rule is discarded. The set of remaining rules becomes the grammar that is extracted as the output of the method according to embodiments of the present disclosure.

(3.2) Experimental Studies

To verify the effectiveness of the method described herein, an experiment was performed using a computer-generated simulation data of two moving objects. The simulation data is a text file of X, Y positions of objects (as described below). The grammar is extracted as described above, with 10 symbols being used for the simulation data, as described below. The movement of the objects are defined by a certain set of rules and constraints in the simulation program, but they are not known to the observer. The simulation data is split into training data (90%) and test data (10%). From the training data, a grammar is extracted, and the extracted grammar is used to predict the movement in the test data.

The raw format of the training data is the X,Y position of the objects. Therefore, since there are two objects, it is a time series data of four values (X and Y positions for two objects). The time interval of the data is 0.5 second, and the average length of each data is 23 seconds. In addition to the X,Y values, the input data is augmented by the quantized speed and direction (stop, slow, or fast, for either north, south, west, or east direction). The X,Y value is quantized by rounding to an integer. From the quantized X,Y values and the velocity (i.e., speed and the heading obtained from the X,Y positions), one symbol is made, such as X23_Y34_V3. The data is also augmented with the position history of the objects, that is, the last 9 positions (i.e., 5 seconds of history). Since there are two objects in the data, each time point is now represented by 2*(9+1)=20 symbols.

Using the data as a set of symbols, the automatic segmentation preprocessing is applied. In this experiment, one of the topic model algorithms called Latent Dirichlet Allocation (LDA) was used. The algorithm needs to predefine the number of topics; in experimental studies, 10 was used as the number of topics. Now the output of the preprocessing is a list of sequence of symbols in varying lengths, but there are only 10 different symbols in the data, since the number of topics is 10. In other words, each time series data is a sentence of some length, and the vocabulary size is 10.

From those training sentences (i.e., the preprocessed training data), a grammar is extracted using the inside-outside algorithm, as described above. Since the extracted grammar has associated probability, one can score the probability of a new sentence given the grammar. The score is used for the evaluation with the test data, as described below. To verify that the extracted grammar is meaningful, it was tested for predicting the object movement in the test data. A region in the test data is defined, and once the object enters the region, the position of the object t seconds later is predicted, where t is 0.5, 1.0, 1.5, 2.0, or 2.5. For comparison, a baseline model was built, which assumes that the object keeps moving with the same speed and the same direction. To apply the extracted grammar, the baseline movement of the object was randomly modified in N=100 ways. For each of the randomly modified movements, the grammar score was obtained, and the move with the highest grammar score was selected. The most likely move is the prediction based on the extracted grammar rules, and the prediction is compared against the baseline model.

The following is the result, which shows the average distance between the predicted and the actual position (in meters), in t seconds later, where t=0.5, 1.0, 1.5, 2.0, and 2.5.
Model as disclosed herein: 0.844 0.843 0.843 0.841 0.839
Baseline Model: 0.681 1.242 1.679 1.993 2.196
As shown, the model according to embodiments of the present disclosure, which utilizes the extracted grammar, has a better prediction accuracy when t is larger than 0.5 second.

Since the method described herein is utilized to analyze time series data, any company or program that involves such data will benefit from this invention. Time series data of moving objects, such as vehicles or aircraft, is one non-limiting example. For instance, the moving object prediction, generated as described herein, can be a component of self-driving vehicle technology. In this example, the self-driving vehicle uses the prediction of other moving vehicles/people surrounding the self-driving vehicle to determine what driving actions to perform (e.g., braking, accelerating, turning).

Figure 3A:
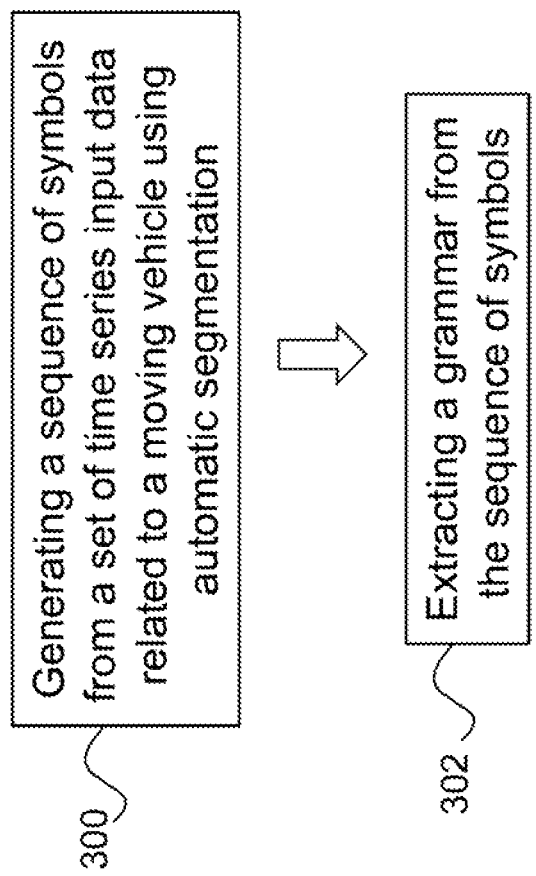
FIG. 3A is a flow diagram illustrating extraction of a grammar from time series input data according to some embodiments of the present disclosure.
Figure 3B:
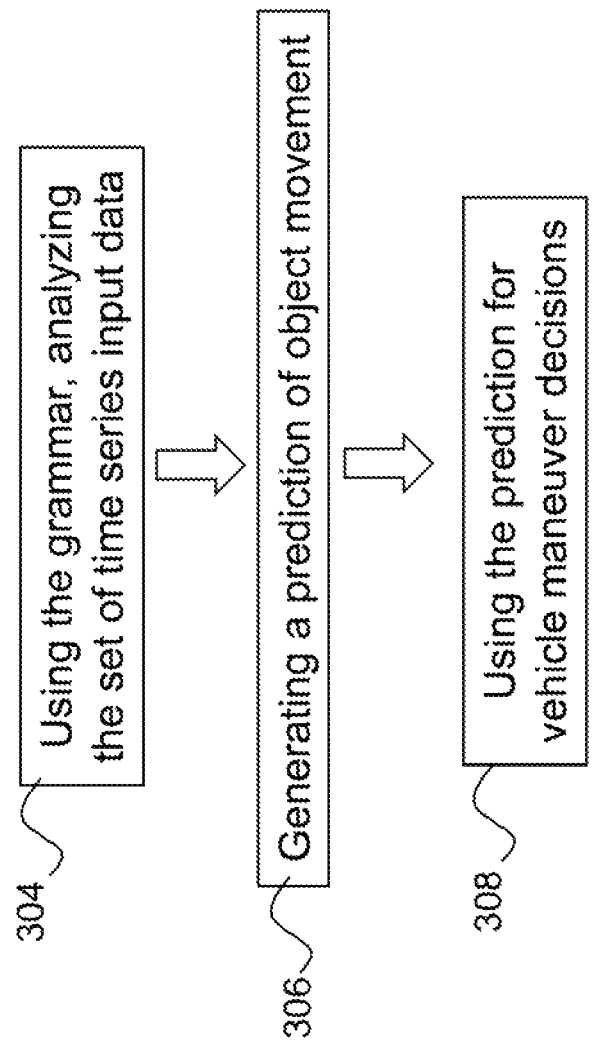
FIG. 3B is a flow diagram illustrating using the extracted grammar to analyze data from a vehicle according to some embodiments of the present disclosure.

FIGS. 3A and 3B depict a method for time series analysis according to embodiments of the present disclosure. Specifically, FIG. 3A illustrates extraction of a grammar from time series input data, and FIG. 3B illustrates using the extracted grammar to analyze data from a vehicle. As described in detail above, the system generates a sequence of symbols from a set of time series input data related to a moving object (e.g., vehicle (airplane, automobile) using automatic segmentation (element 300). Automatic segmentation (element 300) is a process that breaks up a series of data into pieces. In this example, a series of data is converted into a sequence of symbols, such as "AAACCFFFFFCCCDD". Then, a sequence of the same symbol is defined as a segment, such as "AAA", and "CC". A grammar is then extracted from the sequence of symbols (element 302). Using the grammar, the set of time series input data is analyzed (element 304) and a prediction is generated regarding the moving object (element 306). In this example, the prediction is utilized for making autonomous vehicle maneuvering decisions (element 308) based on the object's position in relation to the vehicle, such as braking if the moving object is too close, or accelerating if the moving object is sufficiently far away. The system can then cause the vehicle to subsequently execute those decisions (i.e., such as braking, or accelerating, or turning, etc.).

For further illustration, following is an example from start to finish, illustrating the input of a time series data of a moving vehicle to an example outcome in which an autonomous vehicle slows down to avoid a collision with the moving vehicle. In the embodiments described herein a grammar is extracted for other moving vehicles in the vicinity of an autonomous vehicle. However, as can be appreciated by one skilled in the art, it is also possible to extract a grammar for the autonomous vehicle. A sequence of symbols and the grammar can be generated for all vehicles once and then the grammar applied to each moving vehicle to generate a prediction of vehicle movement. The grammar gives the probability given a sequence of data. In this example, the system reviews all possible vehicle moves, such as changes in speed (increase or decrease) and turning (right or left). For each movement, the grammar gives the probability, showing which movement is more likely than others.

Time series data can be obtained for a moving vehicle proximate the autonomous vehicle. The time series data can be obtained from sensors, such as radar and LIDAR. A sequence of symbols is generated regarding the moving vehicle. The sequence of symbols comprises topic labels, such as "vehicle", and a grammar is extracted from the sequence of symbols. Based on extracted grammar rules, a grammar score can be given to movements of the moving vehicle, and the movement with the highest score is selected as the most likely (i.e., predicted) move of the moving vehicle. Thus, if the predicted move of the moving vehicle proximate (e.g., in front of) the autonomous vehicle is deceleration, then a processor in the autonomous vehicle can send control commands to the braking system of the autonomous vehicle to apply a braking operation to slow down the autonomous vehicle.

As can be appreciated by one skilled in the art, different types of input data would need a different grammar. Using the system described herein, it would be possible to convert the input data into a normalized form and use a grammar for the normalized form.

Figure 4:
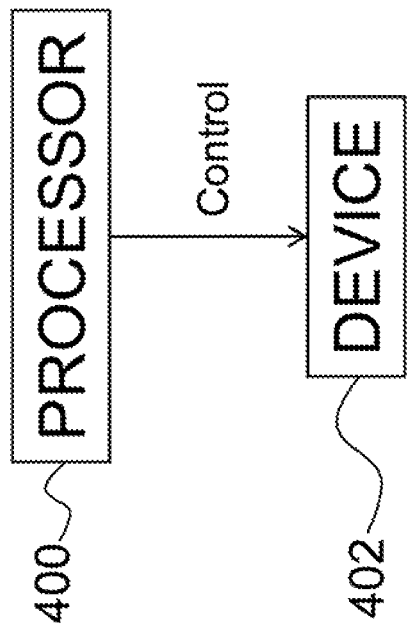
FIG. 4 is a flow diagram illustrating control of devices using the predicted movement of an object according to some embodiments of the present disclosure.

FIG. 4 is a flow diagram illustrating using a processor 400 to control a device 402 using the predicted move of a moving object (e.g., vehicle). Non-limiting examples of devices 402 that can be controlled via the processor 400 and the prediction generated from the extracted grammar include a vehicle or a vehicle component, such as a brake, a steering mechanism, suspension, or safety device (e.g., airbags, seatbelt tensioners, etc.). Further, the vehicle could be an unmanned aerial vehicle (UAV), an autonomous ground vehicle, or a human operated vehicle controlled either by a driver or by a remote operator. As can be appreciated by one skilled in the art, control of other device types is also possible.

In summary, the system and method according to embodiments of the present disclosure particularly analyzes the internal structure of the data that is expressed in terms of "grammar rules". Using an unsupervised automatic segmentation algorithm for trajectory data is a popular method, such as described in Literature Reference No. 3. However, as disclosed herein, the output from the segmentation algorithm is used as the terminal symbols for a grammar, which is a unique approach. One of the biggest problems in using a grammar in data analysis is the scalability of the algorithms. The most popular type of grammar is a context-free grammar, which is known to be a cubic-time algorithm. A cubic-time algorithm needs a computation cost that is proportional to the cubic (N times N times N) of an input parameter N, which is often the size of the data. Therefore, only a short-length data can be analyzed by grammar-based algorithms. The invention described herein mitigates the problem by introducing a prepossessing step (e.g., using an automatic segmentation) and by imposing "head-grammar" in the extracted grammar.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for creating and using a grammar for one or more vehicles, the system comprising:
one or more processors and a non-transitory computer-readable medium having executable instructions encoded thereon such that when executed, the one or more processors perform operations of:
converting a set of time series input data related to a moving object proximate a vehicle to a sequence of symbols;
applying an automatic segmentation algorithm to the sequence of symbols to generate a plurality of segments, each segment comprising the same symbol;
extracting a grammar from the sequence of symbols, wherein the grammar is a head grammar subset of a probabilistic context-free grammar (PCFG);
using the grammar, analyzing the set of time series input data;
generating a prediction of the moving object's movement; and
using the prediction, making a maneuvering decision for the vehicle.

2. The system as set forth in claim 1, wherein the one or more processors further perform an operation of converting raw time series data into the set of time series input data, wherein multi-valued data is combined into a single value data.

3. The system as set forth in claim 1, wherein the sequence of symbols comprises one of topic labels and cluster identifications.

4. The system as set forth in claim 1, wherein the set of time series input data is expressed in terms of grammar rules, and wherein each grammar rule has a left-hand side symbol and at least one right-hand side symbol, and wherein the left-hand side symbol is always one of the right-hand side symbols.

5. The system as set forth in claim 4, wherein a probability is associated with each grammar rule, wherein grammar rules having a probability below a predetermined threshold are discarded, and grammar rules having a probability above a predetermined threshold become the grammar.

6. The system as set forth in claim 1, wherein the automatic segmentation algorithm generates a fixed number of symbols.

7. A computer implemented method for creating and using a grammar for one or more vehicles, comprising an act of causing one or more processors to execute instructions stored on a non-transitory memory such that upon execution, the one or more processors perform operations of:
converting a set of time series input data related to a moving object proximate a vehicle to a sequence of symbols;
applying an automatic segmentation algorithm to the sequence of symbols to generate a plurality of segments, each segment comprising the same symbol;
extracting a grammar from the sequence of symbols, wherein the grammar is a head grammar subset of a probabilistic context-free grammar (PCFG);
using the grammar, analyzing the set of time series input data;
generating a prediction of the moving object's movement; and
using the prediction, making a maneuvering decision for the vehicle.

8. The method as set forth in claim 7, wherein the one or more processors further perform an operation of converting raw time series data into the set of time series input data, wherein multi-valued data is combined into a single value data.

9. The method as set forth in claim 7, wherein the sequence of symbols comprises one of topic labels and cluster identifications.

10. The method as set forth in claim 7, wherein the set of time series input data is expressed in terms of grammar rules, and wherein each grammar rule has a left-hand side symbol and at least one right-hand side symbol, and wherein the left-hand side symbol is always one of the right-hand side symbols.

11. The method as set forth in claim 10, wherein a probability is associated with each grammar rule, wherein grammar rules having a probability below a predetermined threshold are discarded, and grammar rules having a probability above a predetermined threshold become the grammar.

12. The method as set forth in claim 7, wherein the automatic segmentation algorithm generates a fixed number of symbols.

13. A computer program product for creating and using a grammar for one or more vehicles, the computer program product comprising:
computer-readable instructions stored on a non-transitory computer-readable medium that are executable by a computer having one or more processors for causing the processor to perform operations of:
converting a set of time series input data related to a moving object proximate a vehicle to a sequence of symbols;
applying an automatic segmentation algorithm to the sequence of symbols to generate a plurality of segments, each segment comprising the same symbol;
extracting a grammar from the sequence of symbols, wherein the grammar is a head grammar subset of a probabilistic context-free grammar (PCFG);
using the grammar, analyzing the set of time series input data;
generating a prediction of the moving object's movement; and using the prediction, making a maneuvering decision for the vehicle.

14. The computer program product as set forth in claim 13, further comprising instructions for causing the one or more processors to perform an operation of converting raw time series data into the set of time series input data, wherein multi-valued data is combined into a single value data.

15. The computer program product as set forth in claim 13, wherein the sequence of symbols comprises one of topic labels and cluster identifications.

16. The computer program product as set forth in claim 13, wherein the set of time series input data is expressed in terms of grammar rules, and wherein each grammar rule has a left-hand side symbol and at least one right-hand side symbol, and wherein the left-hand side symbol is always one of the right-hand side symbols.

17. The computer program product as set forth in claim 16, wherein a probability is associated with each grammar rule, wherein grammar rules having a probability below a predetermined threshold are discarded, and grammar rules having a probability above a predetermined threshold become the grammar.

18. The computer program product as set forth in claim 13, wherein the automatic segmentation algorithm generates a fixed number of symbols.

* * * * *